(12) United States Patent
Hinque

(10) Patent No.: US 9,701,166 B2
(45) Date of Patent: Jul. 11, 2017

(54) BI-DIRECTIONAL SELF-INFLATING TIRE WITH PRESSURE REGULATOR

(71) Applicant: The Goodyear Tire & Rubber Company, Akron, OH (US)

(72) Inventor: Daniel Paul Luc Marie Hinque, Habay-la-Neuve (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 290 days.

(21) Appl. No.: 14/538,845

(22) Filed: Nov. 12, 2014

(65) Prior Publication Data

US 2015/0165840 A1 Jun. 18, 2015

Related U.S. Application Data

(60) Provisional application No. 61/916,931, filed on Dec. 17, 2013.

(51) Int. Cl.
*B60C 23/12* (2006.01)

(52) U.S. Cl.
CPC ........ *B60C 23/12* (2013.01); *Y10T 152/10495* (2015.01)

(58) Field of Classification Search
CPC ........ B60C 23/004; B60C 23/10; B60C 23/12
USPC .......................................... 152/419, 423–426
See application file for complete search history.

(56) References Cited

U.S. PATENT DOCUMENTS

| | | | |
|---|---|---|---|
| 638,628 A | 12/1899 | Everett et al. | |
| 1,050,886 A | 1/1913 | Wetherell | |
| 1,134,361 A | 4/1915 | Wetherell | |
| 2,095,489 A | 9/1935 | Cotton | |
| 3,304,981 A | 2/1967 | Sheppard | |
| 3,833,041 A | 9/1974 | Glad et al. | |
| 3,867,973 A | 2/1975 | Cozzolino et al. | |
| 4,922,984 A | 5/1990 | Dosjoub et al. | |
| 5,472,032 A | 12/1995 | Winston et al. | |
| 7,117,731 B2 | 10/2006 | Hrabal | |
| 7,225,845 B2 | 6/2007 | Ellmann | |
| 8,042,586 B2 | 10/2011 | Losey et al. | |
| 8,113,254 B2 | 2/2012 | Benedict | |
| 8,156,978 B1 | 4/2012 | Hinque et al. | |
| 8,235,081 B2 | 8/2012 | Delgado et al. | |
| 8,291,950 B2 | 10/2012 | Hinque et al. | |

(Continued)

FOREIGN PATENT DOCUMENTS

| | | |
|---|---|---|
| DE | 3433318 | 3/1986 |
| DE | 3433318 A1 | 3/1986 |

(Continued)

OTHER PUBLICATIONS

European Search Report for Application No. EP14197271 dated Jun. 16, 2015.

*Primary Examiner* — Jason Bellinger
(74) *Attorney, Agent, or Firm* — June E. Rickey

(57) ABSTRACT

A self-inflating tire assembly includes an air tube connected to a tire and defining an air passageway, the air tube being composed of a flexible material operative to allow an air tube segment opposite a tire footprint to flatten, closing the passageway, and resiliently unflatten into an original configuration. The air tube is sequentially flattened by the tire footprint in a direction opposite to a tire direction of rotation to pump air along the passageway to a regulator device. The regulator device regulates the inlet air flow to the air tube and the outlet air flow to the tire cavity.

15 Claims, 8 Drawing Sheets

(56) References Cited

U.S. PATENT DOCUMENTS

| | | |
|---|---|---|
| 8,573,270 B2 | 11/2013 | Hinque |
| 8,857,484 B2 | 10/2014 | Hinque |
| 2004/0112495 A1 | 6/2004 | Weise |
| 2006/0118224 A1 | 6/2006 | Ellmann |
| 2007/0017615 A1 | 1/2007 | Nobuchika et al. |
| 2009/0294006 A1 | 12/2009 | Hrabal |
| 2010/0243121 A1 | 9/2010 | Eigenbrode |
| 2011/0120611 A1 | 5/2011 | Hansen |
| 2011/0146867 A1 | 6/2011 | Benedict |
| 2011/0146868 A1 | 6/2011 | Losey et al. |
| 2012/0073716 A1 | 3/2012 | Benedict |
| 2012/0090766 A1 | 4/2012 | Hinque et al. |
| 2012/0125504 A1 | 5/2012 | Delgado et al. |
| 2012/0125510 A1 | 5/2012 | Delgado et al. |
| 2012/0160386 A1 | 6/2012 | Hinque et al. |
| 2013/0048176 A1 | 2/2013 | Hinque |
| 2013/0048177 A1 | 2/2013 | Hinque |
| 2013/0048178 A1 | 2/2013 | Hinque |
| 2013/0112328 A1 | 5/2013 | Hinque et al. |
| 2013/0112329 A1 | 5/2013 | Hinque et al. |
| 2014/0000778 A1 | 1/2014 | Gobinath |
| 2014/0020805 A1 | 1/2014 | Gobinath et al. |
| 2014/0102621 A1 | 4/2014 | Losey |
| 2014/0110029 A1 | 4/2014 | Benedict et al. |
| 2014/0158266 A1 | 6/2014 | Hinque |
| 2014/0174619 A1 | 6/2014 | Hinque |
| 2014/0174620 A1 | 6/2014 | Hinque |
| 2014/0174621 A1 | 6/2014 | Hinque et al. |
| 2014/0174622 A1 | 6/2014 | Hinque |
| 2015/0059951 A1 | 3/2015 | Hinque |
| 2015/0122390 A1 | 5/2015 | Durr |
| 2015/0122391 A1 | 5/2015 | Hinque et al. |
| 2015/0158348 A1 | 6/2015 | Hinque |
| 2015/0158350 A1 | 6/2015 | Hinque et al. |
| 2015/0158353 A1 | 6/2015 | Hinque et al. |
| 2015/0165840 A1 | 6/2015 | Hinque |
| 2015/0165841 A1 | 6/2015 | Hinque |

FOREIGN PATENT DOCUMENTS

| | | |
|---|---|---|
| DE | 3711785 A1 | 10/1988 |
| DE | 3881591 T2 | 1/1989 |
| DE | 4323835 A1 | 1/1995 |
| DE | 102005031099 A1 | 1/2007 |
| DE | 102007018437 A1 | 12/2007 |
| EP | 1604842 A1 | 12/2005 |
| EP | 1648721 B1 | 11/2006 |
| EP | 2565060 A1 | 3/2013 |
| EP | 2746072 A1 | 6/2014 |
| EP | 2881269 A1 | 6/2015 |
| FR | 2318747 | 2/1977 |
| SE | 183890 | 5/1963 |
| WO | 2007134556 | 11/2007 |
| WO | WO2010008338 A1 | 1/2010 |

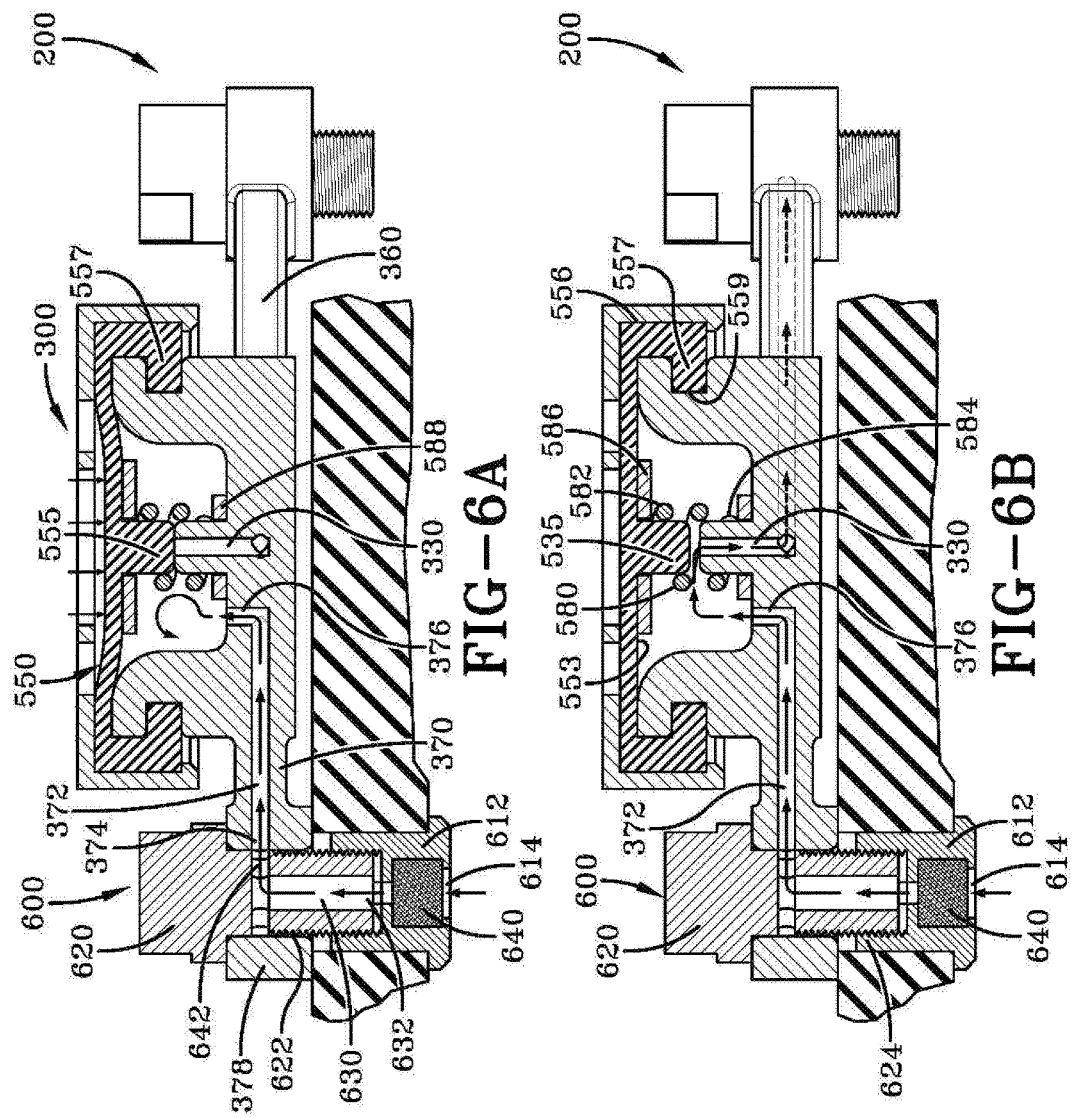

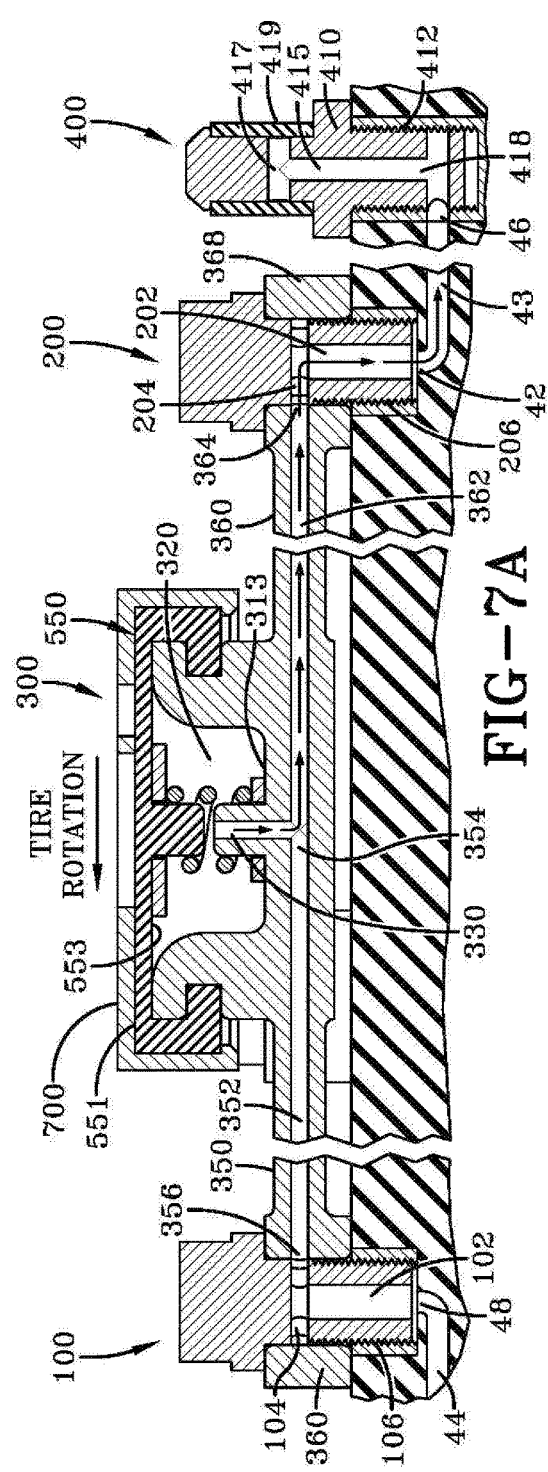
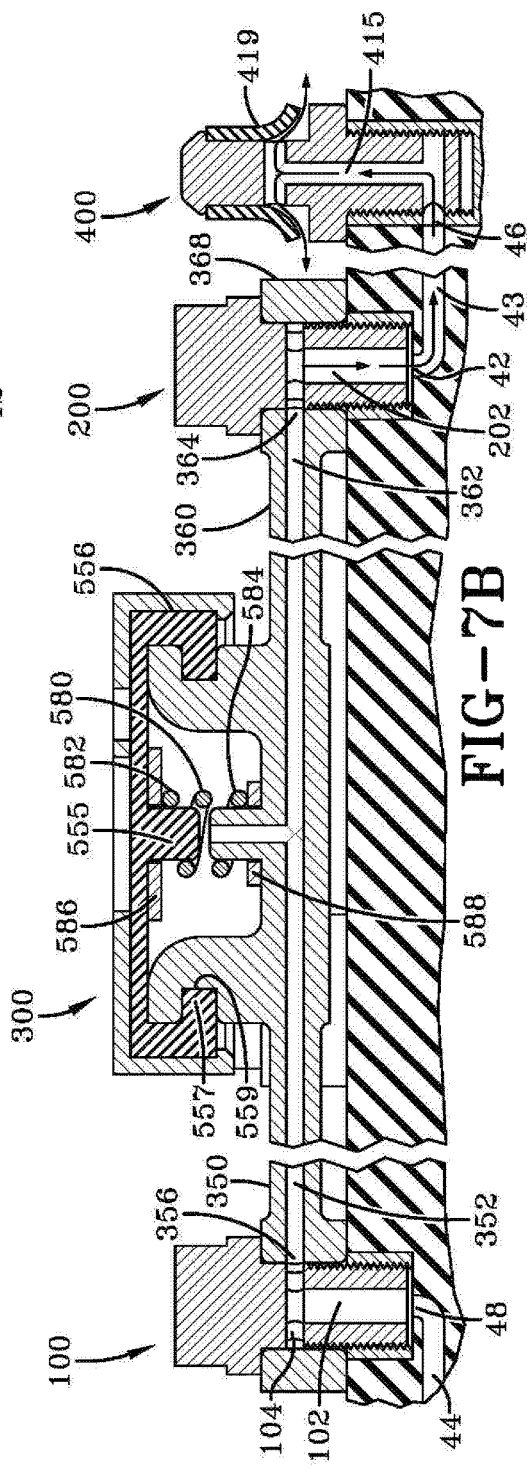
FIG-7A
FIG-7B

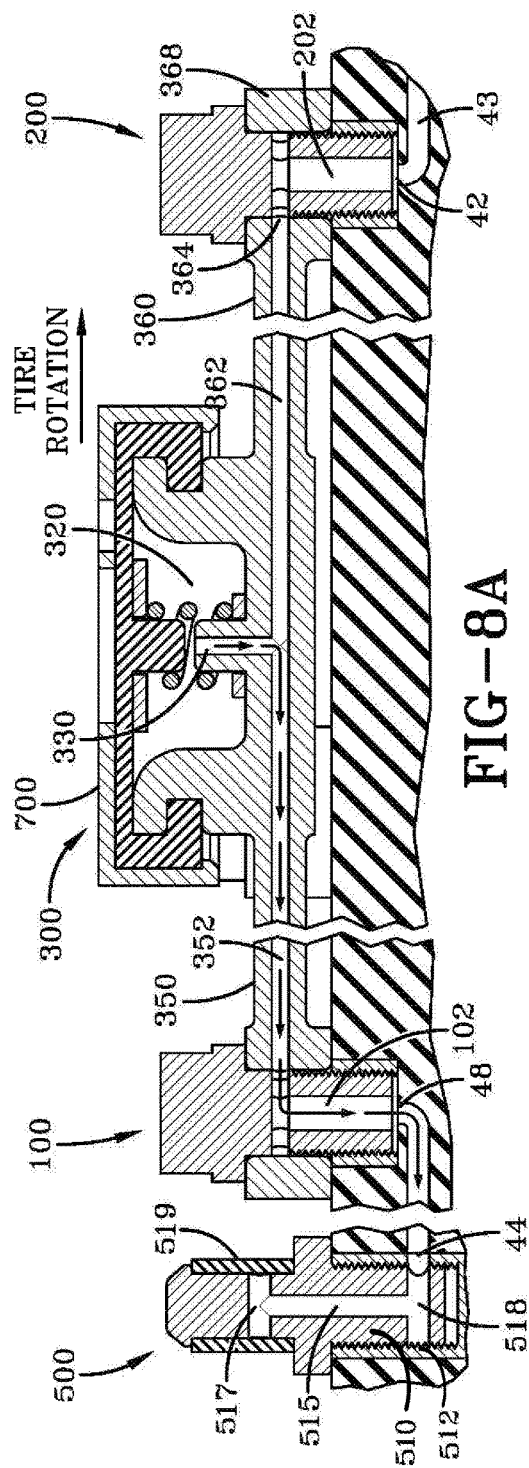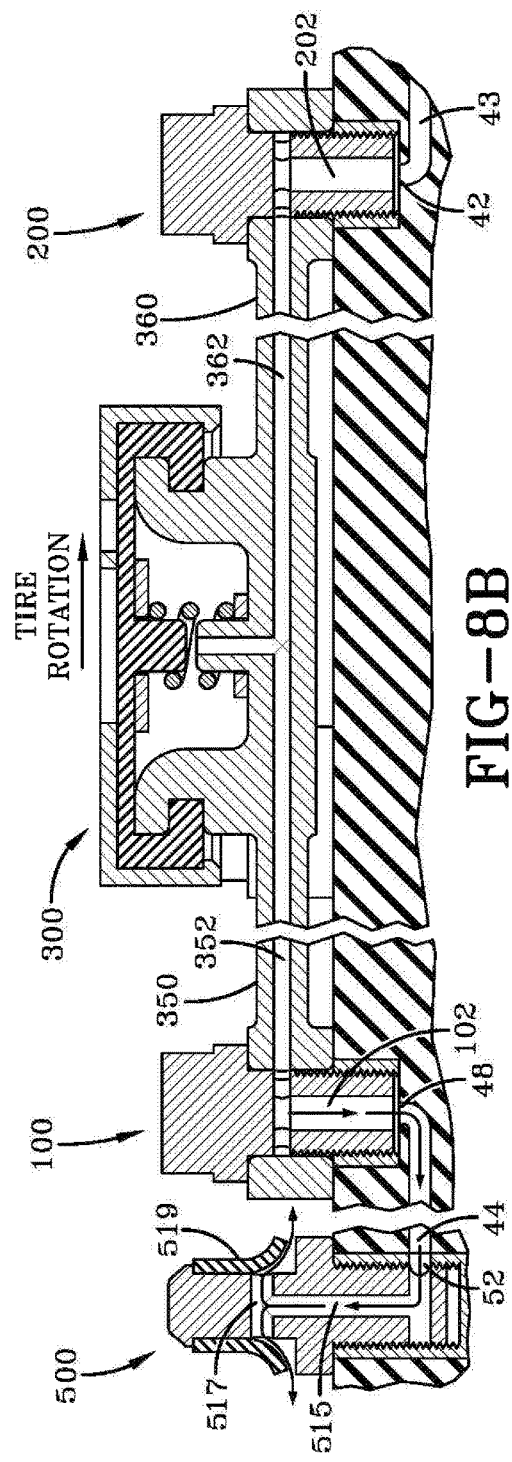

BI-DIRECTIONAL SELF-INFLATING TIRE WITH PRESSURE REGULATOR

FIELD OF THE INVENTION

The invention relates generally to self-inflating tires and, more specifically, to a pump mechanism and pressure regulator for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is desirable, therefore, to incorporate a self-inflating feature within a tire that will self-inflate the tire in order to compensate for any reduction in tire pressure over time without the need for driver intervention.

SUMMARY OF THE INVENTION

The invention provides in a first aspect a self-inflating tire assembly, including a tire mounted to a wheel, the tire having a tire cavity, first and second sidewalls extending respectively from first and second tire bead regions to a tire tread region; a first and second air passageway each having an inlet end and an outlet end, each air passageway being composed of a flexible material operative to open and close when the tire rotates, wherein each air passageway outlet end is in fluid communication with the tire cavity; a regulator device having a regulator body having an interior chamber; a pressure membrane being mounted on the regulator device to enclose the interior chamber, wherein the pressure membrane has a lower surface that is positioned to open and close the outlet port mounted in the interior chamber, wherein the pressure membrane is in fluid communication with the tire cavity pressure; wherein the body of the regulator device has a first, second and third flexible duct, wherein said first, second and third flexible ducts each have an internal passageway; wherein the third flexible duct has a first end in fluid communication with the outside air, and a second end in fluid communication with the interior chamber of the regulator device, wherein the first flexible duct has a first end in fluid communication with the inlet end of the first air passageway, and a second end in fluid communication with the outlet port of the regulator device; wherein the second flexible duct has a first end in fluid communication with the inlet end of the second air passageway, and a second end in fluid communication with the outlet port of the regulator device.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the wheel rim and distribute the flexing above the rim flange.

"Circumferential" means lines or directions extending along the perimeter of a surface, perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 6A is a section view of FIG. 5 in the direction 6A-6A showing the regulator in the closed position during operation.

FIG. 6B is a section view of FIG. 5 in the direction 6A-6A showing the regulator in the open position during operation.

FIG. 7A is a section view of FIG. 5 in the direction 7A-7A showing the regulator in the open position during operation when the tire is rotating in a first direction.

FIG. 7B is a section view of FIG. 5 in the direction 7A-7A showing the regulator in the open position during operation when the tire is rotating in a first direction, and flow exiting the outlet valve from the pump air passageway.

FIG. 8A is a section view of FIG. 5 in the direction 7A-7A showing the regulator in the open position during operation when the tire is rotating in a second direction opposite the first direction.

FIG. 8B is a section view of FIG. 5 in the direction 7A-7A showing the regulator in the open position during operation when the tire is rotating in a second direction opposite the first direction, and flow exiting the outlet valve of the pump air passageway.

DETAILED DESCRIPTION OF THE INVENTION

Figure 1:
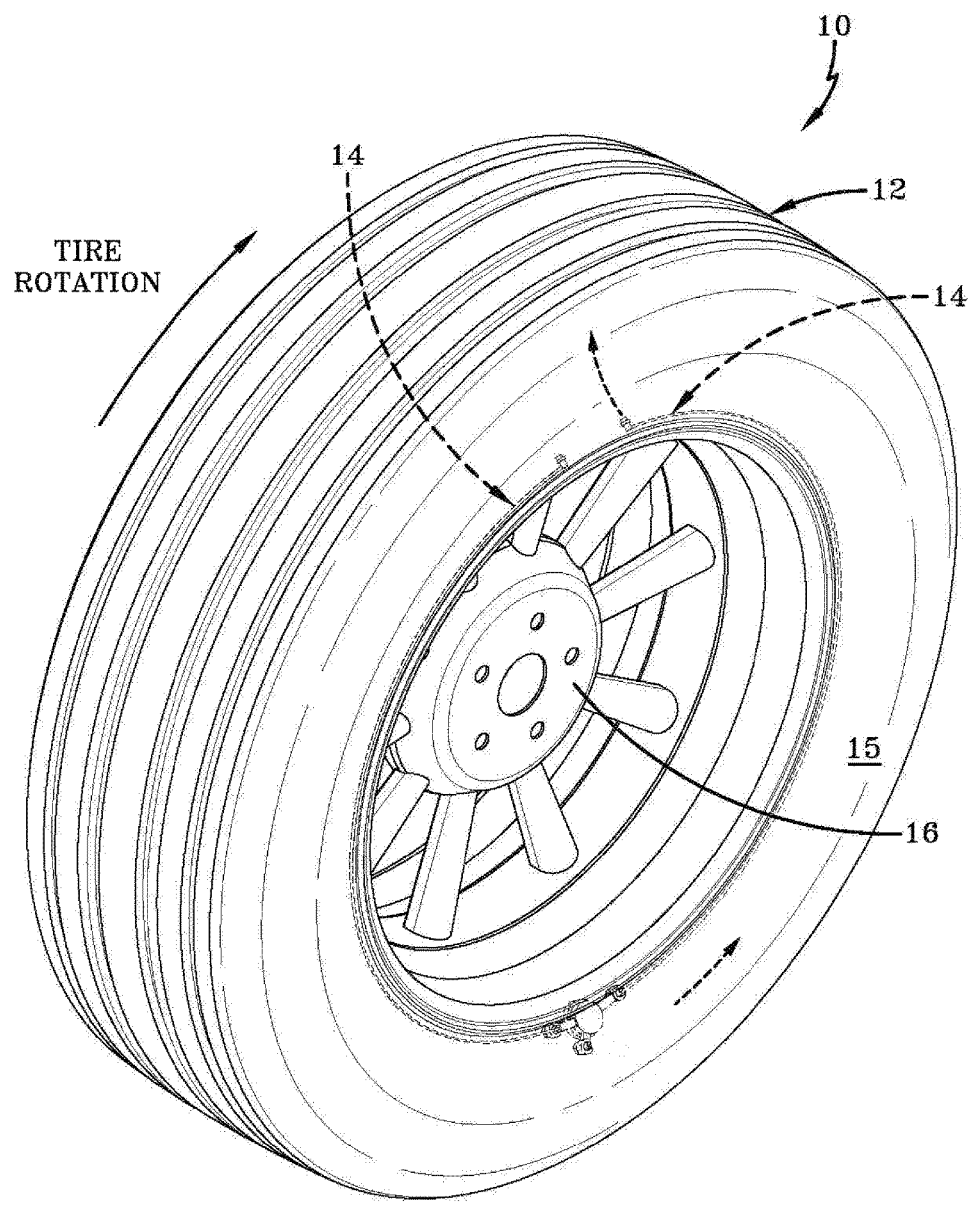
FIG. 1 is an isometric view of tire and wheel assembly showing a pump and regulator assembly.

Referring to FIGS. 1 and 2, a tire assembly 10 includes a tire 12, pump assemblies 14, and a wheel 16. The tire and wheel enclose a tire cavity 40. As shown in FIGS. 1 and 3, the pump assembly 14 is preferably mounted into the sidewall area 15 of the tire, preferably near the bead region.

Pump Assembly 14

The first and second pump assembly 14 includes a first and second air passageway 43, 44 which may be molded into the sidewall of the tire during vulcanization or formed post cure. Each passageway 43, 44 acts as a pump. When the first and second air passageway 43, 44 are molded into the tire sidewall as shown in FIG. 2B, and each the air passageway 43, 44 has an arc length as measured by a respective angle $\Psi1$, $\Psi2$ that is measured from the center of rotation of the tire. In a first embodiment, the angle $\Psi1$, $\Psi2$ may range, and is preferably in the range of at least 150 degrees, and more preferably in the range of about 150-190 degrees, and about 160 degrees as shown. The pump air passageway 43, 44 is comprised of a tube body formed of a resilient, flexible material such as plastic, elastomer or rubber compounds, and is capable of withstanding repeated deformation cycles when the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. Preferably, the tube has a circular cross-sectional shape, although other shapes such as elliptical may be utilized. The tube may be a discrete tube that is inserted into the tire during tire manufacturing, or the tube may be molded into shape by the presence of a removable strip that forms the passageway when removed.

Figure 2A:
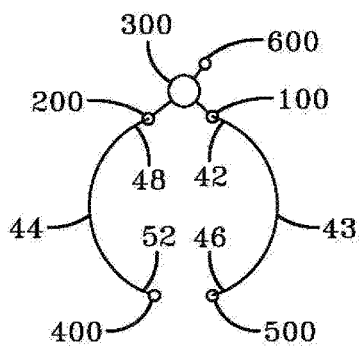
FIG. 2A is a schematic of a double pump and regulator assembly.
Figure 2B:
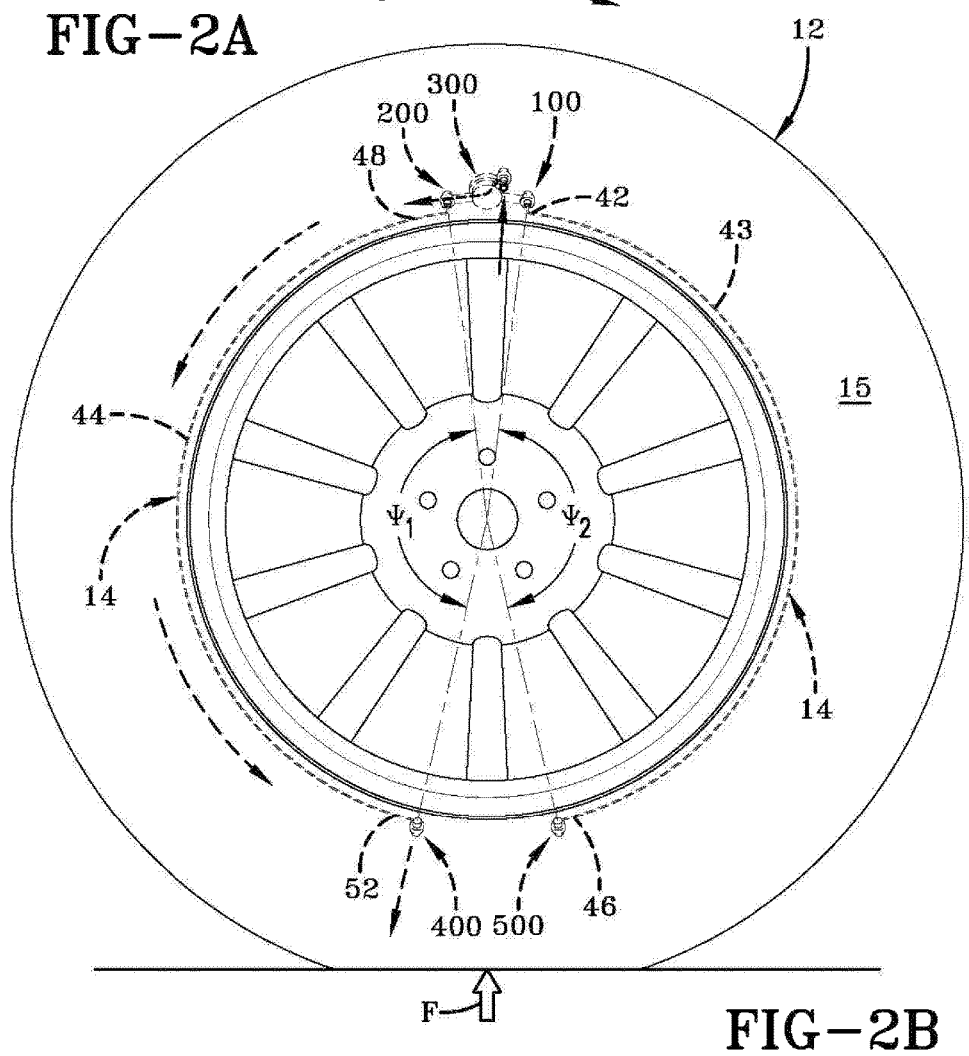
FIG. 2B is a front view of the tire of FIG. 1 showing the system in operation.
Figure 3:
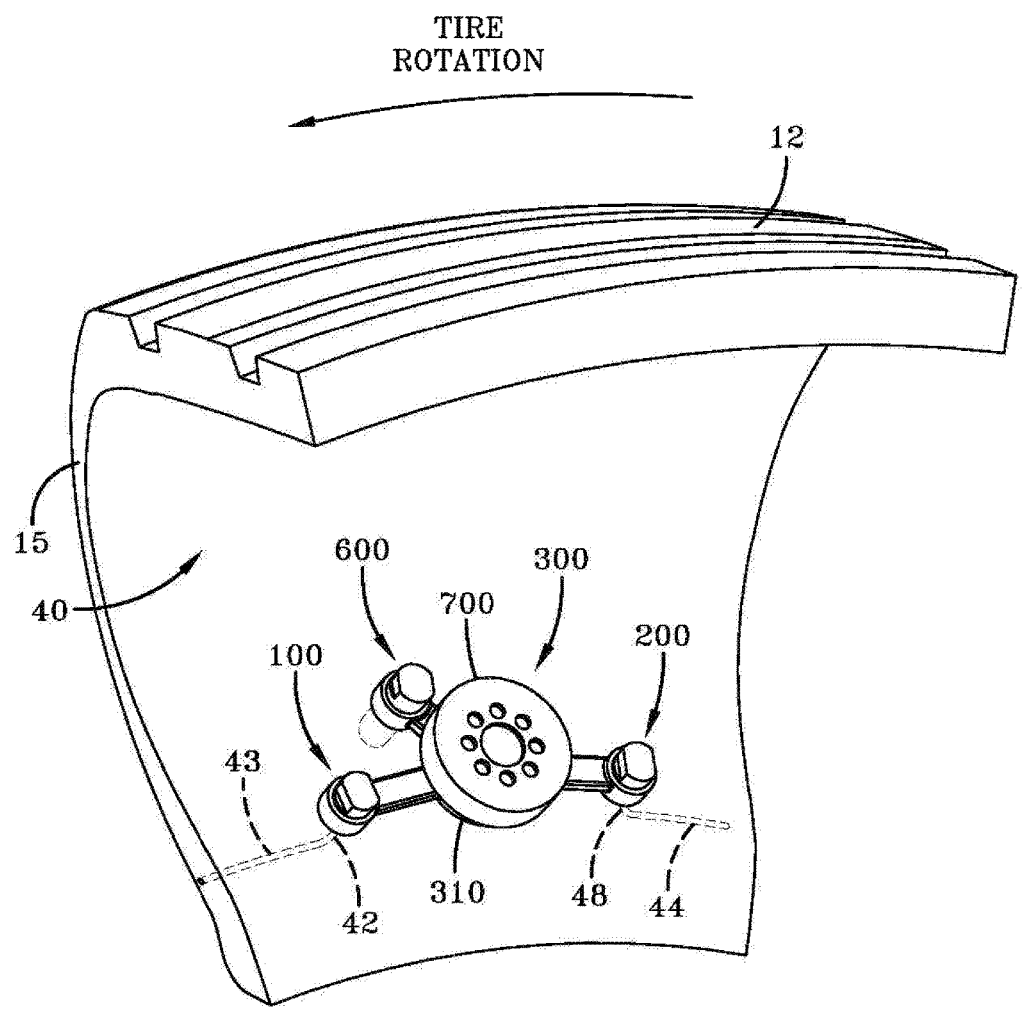
FIG. 3 is a front view of the regulator assembly as shown from inside the tire of FIG. 1.
Figure 4:
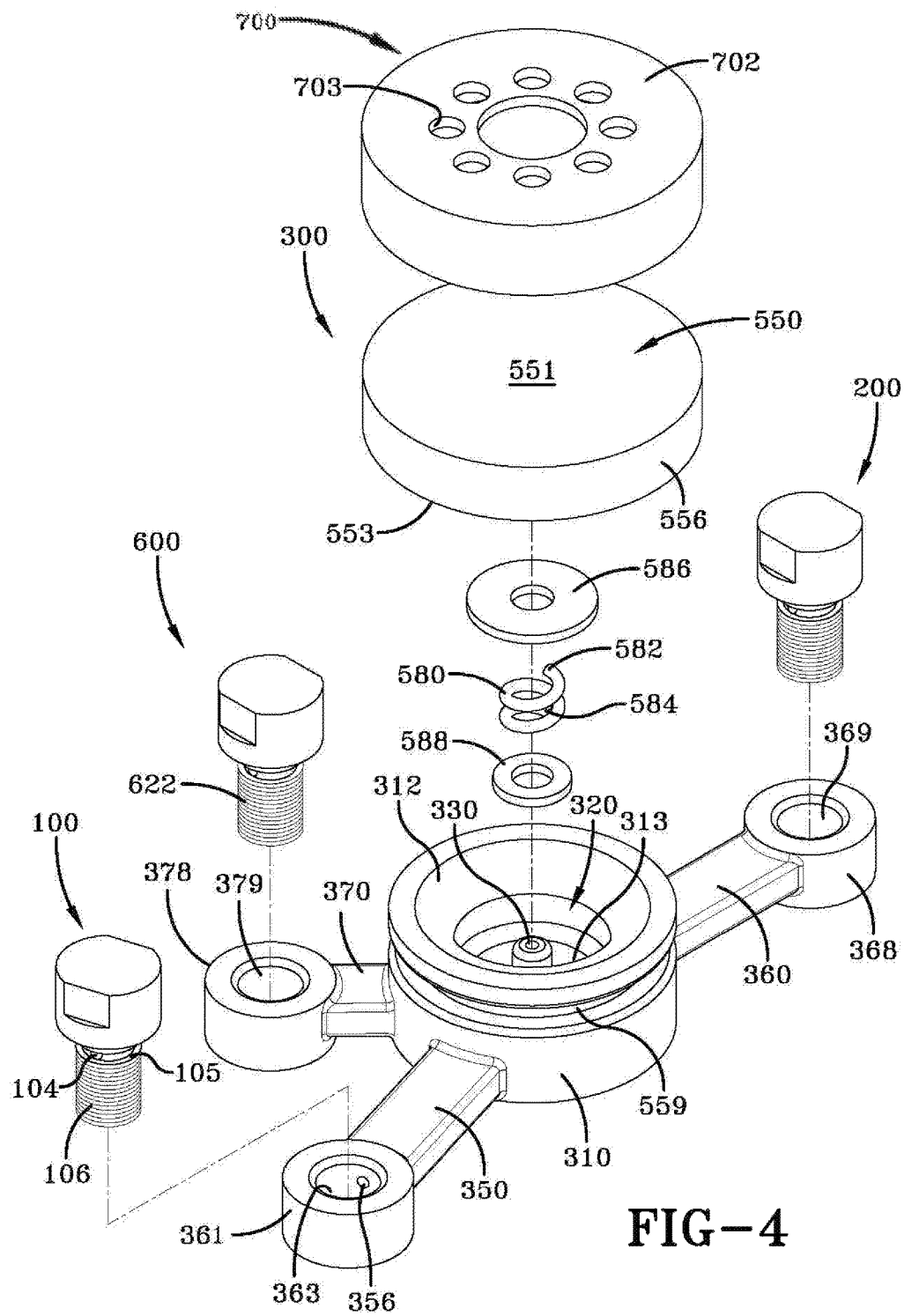
FIG. 4 is an exploded view of the regulator assembly.

As shown in FIG. 2A, an inlet filter assembly 600 is connected to a regulator assembly 300 for providing inlet filtered air to the regulator assembly 300. The regulator assembly is connected to the inlet end 42 of the first pump passageway 43 via an inlet banjo fitting 100. The first pump passageway has an outlet end 46 that is connected to an outlet check valve 400. The regulator assembly is connected to the inlet end 48 of a second pump passageway 44 via a banjo fitting 200. The second pump passageway 44 has an outlet end 52 connected to an outlet check valve 500.

Regulator Device

A regulator device 300 is shown in FIGS. 3-8. The regulator device 300 functions to regulate the flow of air to the air passageways 43, 44. The regulator device 300 has a central regulator housing 310 that houses an interior chamber 320. The interior chamber 320 has a central opening 312. Opposite the central opening 312 is an outlet port 330. The outlet port is raised from the bottom surface 313 and extends into the interior of the chamber 320. The outlet port is positioned to engage a pressure membrane 550.

The pressure membrane has an upper surface 551 that is substantially planar. The pressure membrane has a lower surface 553 wherein a plug 555 extends from the lower surface. The pressure membrane further has an annular sidewall 556 which extends downwardly from the upper surface, forming a lip 557. The lip 557 is preferably annular, and snaps in an annular cutout 559 formed on the outer regulator housing 310. The pressure membrane is a disk shaped member made of a flexible material such as, but not limited to, rubber, elastomer, plastic or silicone. A rigid lid 700 is received over the pressure membrane. The lid 700 has a plurality of holes 703 on an upper surface 702 to allow the outer surface 551 of the pressure membrane to be in fluid communication with the pressure of the tire chamber 40. The outer surface 551 of the pressure membrane is in fluid communication with the pressure of the tire chamber 40 and in contact with the rigid lid 700. The lower surface 553 of the pressure membrane is in fluid communication with the interior chamber 320. The plug 555 is positioned to close the outlet port 330 as shown in FIG. 6A. A spring 580 is positioned in the interior chamber 320 to bias the pressure membrane 550 in the open position. The spring has a first end 582 that is received about the plug 555. The spring has a second end 584 that is wrapped around the outer surface of the outlet port 330. An optional first washer 586 may be received between the spring first end 582 and the pressure membrane 550. An optional second washer 588 may be received between the spring second end 584 and the bottom of the chamber 313. The lid 700 is made of a rigid material, and resists the spring force, thus functioning to preload the spring via the pressure membrane 550. Thus the balance of pressure forces on each side of the pressure membrane actuates the pressure membrane plug 555 to open and close the outlet port 330.

Extending from the central regulator housing 310 is a first, second and third flexible duct 350, 360, 370 positioned on either side of the central regulator housing 310. Each flexible duct 350, 360, 370 may be integrally formed with the regulator housing as shown, or be a discrete part connected to the central regulator housing 310. Each flexible duct 350, 360, 370 has an internal passageway 352, 362, 372 for communicating fluid.

As shown in FIG. 7A, the internal passageway 352 of the first flexible duct 350 has a first end 354 that is connected to the outlet port 330. The first flexible duct 350 has a circular flanged distal end 361 having a hole 363 for receiving the body of the inlet banjo fitting 100. The internal passageway 352 has an outlet hole 356 that is in fluid communication with inlet holes 104 of an inlet banjo fitting 100. A circumferential groove 105 surrounds the inlet holes 104 to channel the fluid from the internal passageway 352 to an internal passageway 102. The internal channel 102 is connected to the inlet 48 of the pump passageway 44. The banjo fitting 100 may be replaced with an internally relieved bolt or a hollow screw with an internal passageway. The banjo fitting 100 has an outer threaded surface 106 that is received in the tire sidewall.

As shown in FIG. 7A, the internal passageway 362 of the second flexible duct 360 is shown connected to the outlet port 330 of the interior chamber 320 and the internal passageway 352 of the first flexible duct 350. The internal passageway 362 has an outlet 364 in fluid communication with a banjo fitting 200. The second flexible duct has a distal end formed in a circular flange 368. The circular flange has a hole 369 for receiving the body of banjo fitting 200. The banjo fitting 200 has an internal passageway 202 with inlet holes 204 that receive flow from the outlet hole 364 of the internal passageway 362 of the second flexible duct 360. The internal passageway 202 communicates flow to the inlet end 42 of the first pump passageway 43. The banjo fitting 200 may comprise a screw with an internal passageway, and has an outer threaded surface 206 that is received in the tire sidewall.

Figure 5:
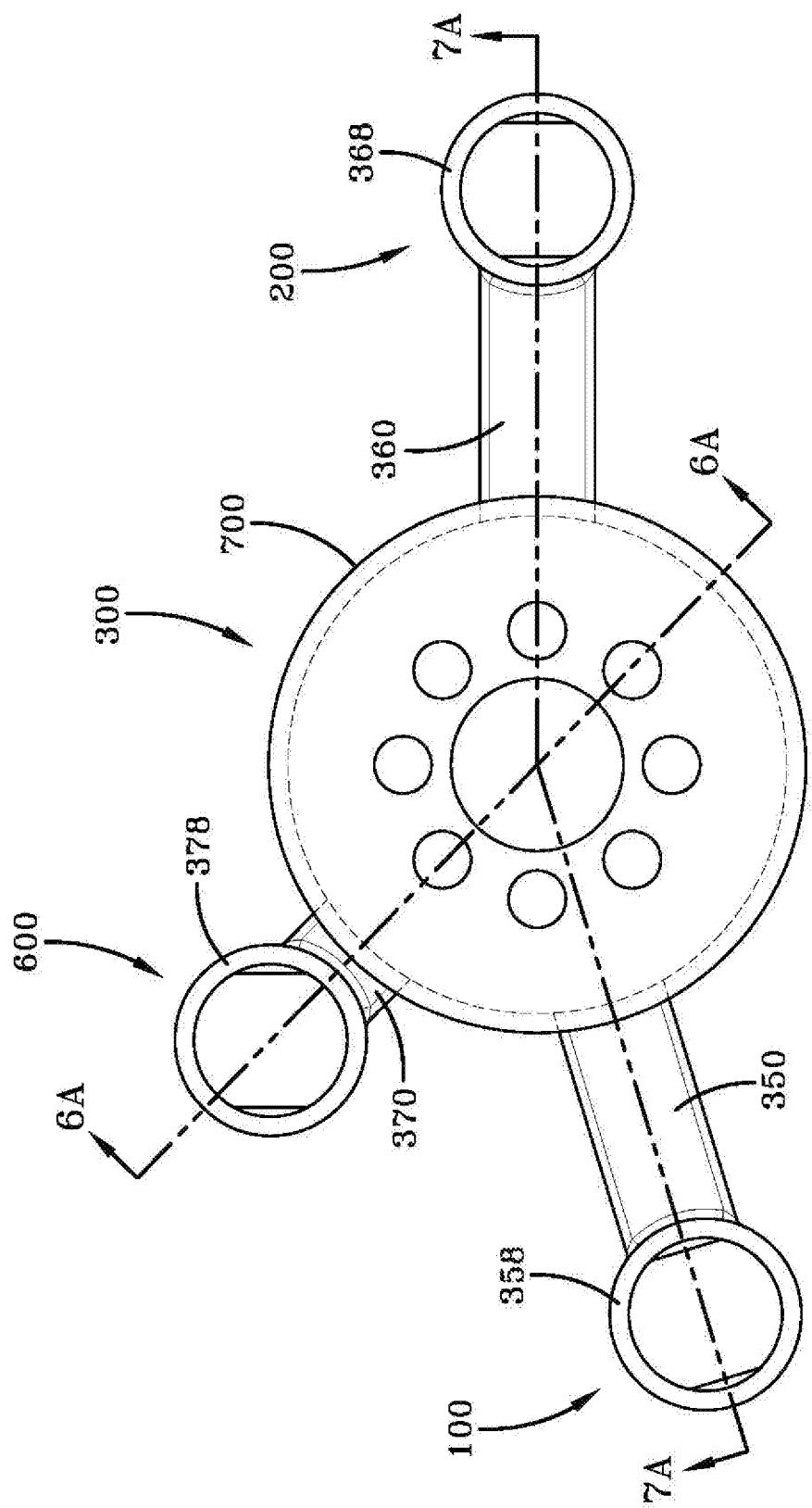
FIG. 5 is a top view of the regulator assembly of FIG. 4.

As shown in FIGS. 5 and 6A, the internal passageway 372 of the third flexible duct 370 has a first opening 374 that is connected to the outlet port 642 of the inlet filter assembly 600. The internal passageway 372 of the first flexible duct 370 has a second end 376 that opens to the inlet chamber 320 of the regulator 300. The third flexible duct has a circular flanged distal end 378 that has an interior hole 379 for receiving the inlet filter assembly 600.

Inlet Filter Assembly

The inlet filter assembly 600 is shown in FIGS. 6A, 6B. The inlet filter assembly 600 includes an insert sleeve 612 that is hollow and has an internal threaded bore 614. The first end of the insert sleeve 612 is inserted into the tire, typically in the outer surface of the sidewall 15. The insert sleeve 612 may be inserted into the tire post cure or may be molded into the tire. An air passage screw 620 has an outer threaded body 622 that is screwed into the second end 624 of the insert sleeve. The air passage screw 620 may be a banjo screw or an internally relieved bolt. The air passage screw 620 has an internal passageway 630 in fluid communication with the bore 614 of the insert sleeve 612. A filter 640 is received within the bore 614 of the insert sleeve 612, and may also be located in the internal passageway 630. The internal passageway 630 has outlet ports 642 that communicates filtered air from the internal passageway 630 to the inlet 374 of the internal passageway 372 of the third flexible duct 370. The internal passageway 372 communicates filtered air to the inlet chamber 320.

Pump Outlet Check Valve

The outlet end 46 of the pump passageway 43 is connected to a pump outlet valve 400. The pump outlet valve is shown in FIGS. 7A-B. The pump outlet valve 400 includes a valve body 410 having an outer threaded surface 412 that is mounted within the sidewall of the tire. The valve body 410 has a central passage 415 that has a first opening 418 that is in fluid communication with the first pump passageway 43 outlet end 46. The central passage 415 has an outlet end 417 that communicates flow to the tire cavity 40. The outlet end 417 is covered by a flexible sleeve 419. The flexible member 419 opens to allow airflow to exit the pump and into the tire cavity 40 as shown in FIG. 7b. The flexible member is shown closed in FIG. 7A, and prevents flow of air from the tire cavity into the pump passageway 43.

The outlet end 52 of second pump passageway 44 is also connected to a pump outlet valve 500, as shown in FIGS. 8A, 8B. The pump outlet valve 500 includes a valve body 510 having an outer threaded surface 512 that is received within the sidewall of the tire. The valve body 510 has a central passage 515 that has a first opening 518 that is in fluid communication with the pump passageway 44 outlet end 52. The central passage 515 has an outlet end 517 that is covered by a flexible member 519. The flexible sleeve 519 opens to allow airflow to exit the pump and into the tire cavity 40 as shown in FIG. 8b. The flexible member is shown closed in FIG. 8A, and prevents back flow of air from the tire cavity into the pump passageway 44.

System Operation

FIGS. 1-2 illustrate the first and second pump assemblies 43, 44. The system is bidirectional, so that only one pump assembly will pump for a given tire direction. Thus if the tire rotates clockwise as viewed from FIG. 2B, pump air passageway 44 will pump air into the tire. When the tire rotates counterclockwise, pump air passageway 43 will pump air into the tire. As shown in FIGS. 2A and 2B, the regulator device 300 is in fluid communication with each inlet end 42, 48 of each pump passageway 43, 44. As the tire rotates, a footprint is formed against the ground surface. A compressive force F is directed into the tire from the footprint and acts to flatten the pump passageway 43, 44. Flattening of the pump passageway 43, 44 forces the compressed air towards the respective pump outlet device 400, 500. Due to the increase in pressure at the pump outlet 46, 52, the pressure opens the sleeve 419, 519 from the opening 417, 517 of the pump outlet valve, which allows the pumped air to exit into the tire cavity 40.

The regulator device 300 controls the inflow of outside air into the pump. If the tire pressure is above the preset threshold value, the plug 555 of the pressure membrane seals the central outlet port 330 and no air enters the pump passageway, as shown in FIG. 6A. The pressure preset threshold value can be predetermined based upon the tire size, and the material properties of the pressure membrane, spring preloading, and spring constant can be selected to determine the pressure at the preset threshold value. If the tire pressure falls below the preset threshold value, the plug 555 of the membrane 550 will unseat from the central outlet port 330, opening the outlet port 330 as shown in FIG. 6B. As the chamber pressure 320 falls due to the opening of the central outlet port 330, outside air will be sucked through the filter assembly 600 to the interior chamber 320. If the tire rotates in a clockwise direction as shown in FIGS. 8A and 8B, the filtered air exits the interior chamber through the outlet port 330, and enters the first flexible duct 360. Then the filtered air passes through the banjo fitting 100 into the pump inlet 48, as shown in FIG. 8A. The flow is then compressed through the pump passageway 44 and then exits the pump outlet valve 400 into the tire cavity 40 as shown in FIG. 8B. The pump will pump air with each tire rotation. The pump passageway 44 fills with air when the pump system is not in the footprint.

If the tire rotates in a counterclockwise direction as shown in FIGS. 7A and 7B, the filtered air exits the interior chamber 320 through the outlet port 330, and enters the second flexible duct 360 then through the banjo fitting 200 and then into the pump inlet 42. The flow is then compressed through the pump passageway 43 and then exits the pump outlet valve 400 into the tire cavity 40. The pump will pump air with each tire rotation. The pump passageway 43 fills with air when the pump system is not in the footprint.

The location of the pump assembly in the tire will be understood from FIGS. 1, 2A and 3. In one embodiment, the pump assembly 14 is positioned in the tire sidewall, radially outward of the rim flange surface. So positioned, the air passageway 43, 44 is radially inward from the tire footprint and is thus positioned to be flattened by forces directed from the tire footprint as described above. Although the positioning of the air passageway 43, 44 is specifically shown in a region of the tire near the bead region, it is not limited to same, and may be located at any region of the tire that undergoes cyclical compression. The cross-sectional shape of the air passageway 43, 44 may be elliptical or round or any desired shape.

The length as represented by the angle Ψ of each pump passageway is illustrated at about 160 degrees, the invention is not limited to same, and may be shorter or longer as desired.

The pump assembly 14 may also be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
   a tire mounted to a rim, the tire having a tire cavity, first and second sidewalls extending respectively from first and second tire bead regions to a tire tread region;
   a first and second air passageway each having an inlet end and an outlet end, each air passageway being composed of a flexible material operative to open and close when the tire rotates, wherein each air passageway outlet end is in fluid communication with the tire cavity;
   a regulator device having a regulator body having an interior chamber; a pressure membrane being mounted on the regulator device to enclose the interior chamber, wherein the pressure membrane has a lower surface that is positioned to open and close an outlet port mounted in the interior chamber, wherein the pressure membrane is in fluid communication with the tire cavity pressure; and
   wherein the body of the regulator device has a first, second and third flexible duct, wherein said first, second and third flexible ducts each have an internal passageway; wherein the third flexible duct has a first end in fluid communication with the outside air, and a second end in fluid communication with the interior chamber of the regulator device, wherein the first flexible duct has a first end in fluid communication with the inlet end of the first air passageway, and a second end in fluid communication with the outlet port of the regulator device; wherein the second flexible duct has a first end in fluid communication with the inlet end of the second air passageway, and a second end in fluid communication with the outlet port of the regulator device.

2. The self-inflating tire assembly of claim 1 wherein a spring is positioned in the interior chamber, wherein the spring biases the pressure membrane into the open position.

3. The self-inflating tire assembly of claim 1 wherein the first air passageway is located in the sidewall of the tire.

4. The self-inflating tire assembly of claim 1 wherein the second air passageway is located in the sidewall of the tire.

5. The self-inflating tire assembly of claim 1 wherein the outlet port of the regulator device is connected to the second end of the first flexible duct.

6. The self-inflating tire assembly of claim 1 wherein the outlet port of the regulator device is connected to the second end of the second flexible duct.

7. The self-inflating tire assembly of claim 1 wherein the regulator body is not directly mounted in the tire.

8. The self-inflating tire assembly of claim 1 wherein the inlet device has a filter.

9. The self-inflating tire assembly of claim 1, wherein the air passageway is substantially of elliptical in cross-section.

10. The self-inflating tire assembly of claim 1, wherein the air passageway is positioned between a tire bead region and the rim tire mounting surface radially inward of the tire tread region.

11. The self-inflating tire assembly of claim 1, wherein a check valve is located between the outlet of the first air passageway and the tire cavity.

12. The self-inflating tire assembly of claim 1, wherein a check valve is located between the outlet of the second air passageway and the tire cavity.

13. The self-inflating tire assembly of claim 1 wherein the regulator device is mounted to the inside of the tire by a first and second banjo fitting which is affixed to the inside surface of the tire.

14. The self-inflating tire assembly of claim 12 wherein the check valve has a flexible sleeve positioned for covering an outlet port of the check valve.

15. The self-inflating tire assembly of claim 11 wherein the check valve has a flexible sleeve positioned for covering an outlet port of the check valve.

* * * * *